United States Patent [19]

Allen

[11] 4,008,524
[45] Feb. 22, 1977

[54] GROWTH MEASURING SCALE

[76] Inventor: Cloy L. Allen, P. O. Box 224, Wingate, Tex. 79566

[22] Filed: Feb. 20, 1976

[21] Appl. No.: 659,887

[52] U.S. Cl. ............................. 33/169 R; 116/136
[51] Int. Cl.² .................... G01B 5/02; G01B 3/20
[58] Field of Search ............. 33/169 R, 174 D; 116/130, 131, 136

[56] References Cited

UNITED STATES PATENTS

| | | | |
|---|---|---|---|
| 532,793 | 1/1895 | Von Lange | 33/169 R |
| 1,996,553 | 4/1935 | Scully | 33/169 R |
| 2,215,884 | 9/1940 | Runge | 33/169 R |
| 2,736,100 | 2/1956 | Landau | 33/169 R |

FOREIGN PATENTS OR APPLICATIONS 535,838  4/1941  United Kingdom ............. 33/169 R Primary Examiner—Henry K. Artis
Assistant Examiner—Richard R. Stearns
Attorney, Agent, or Firm—Robert K. Rhea

[57] ABSTRACT

An elongated sloping flange I-beam type panel, adapted to be vertically secured longitudinally to a wall surface, is provided with parallel tracks which slidably support a vertically movable head. A coextensive rack is secured to the panel web medially its width. The head is provided with a manually rotatable transverse shaft having coaxial pinions engageable with the rack for vertical adjustment of the head with respect to the scale or locking the head piece in a selected location. The head is provided with a depending head bar movable to a horizontal position for alignment with height measuring indicia on the panel when the head bar is disposed above the head of the person whose height is being measured. A plurality of pins are provided for insertion into a selected one of a plurality of apertures formed in the web in vertically spaced horizontal rows to form a permanent record of the height attained as shown by the position of the head bar.

7 Claims, 14 Drawing Figures

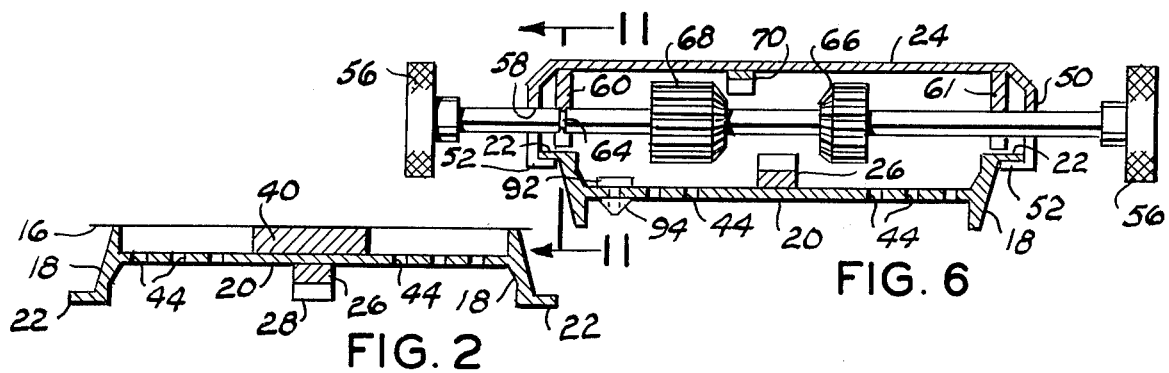
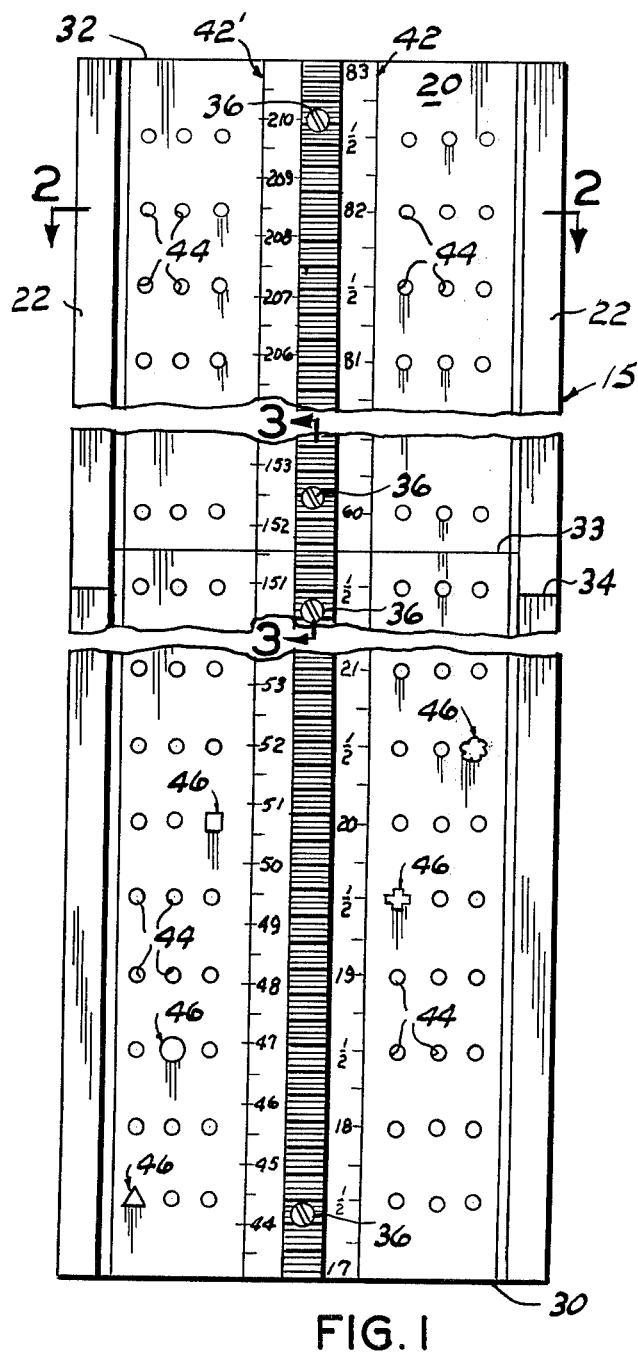
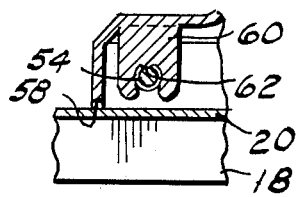
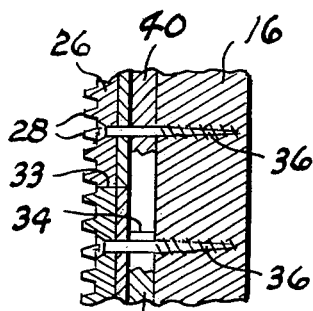
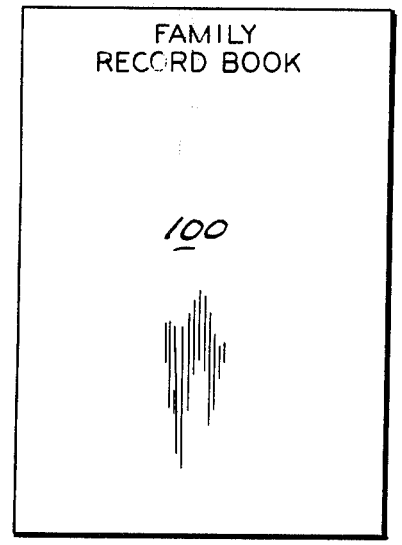

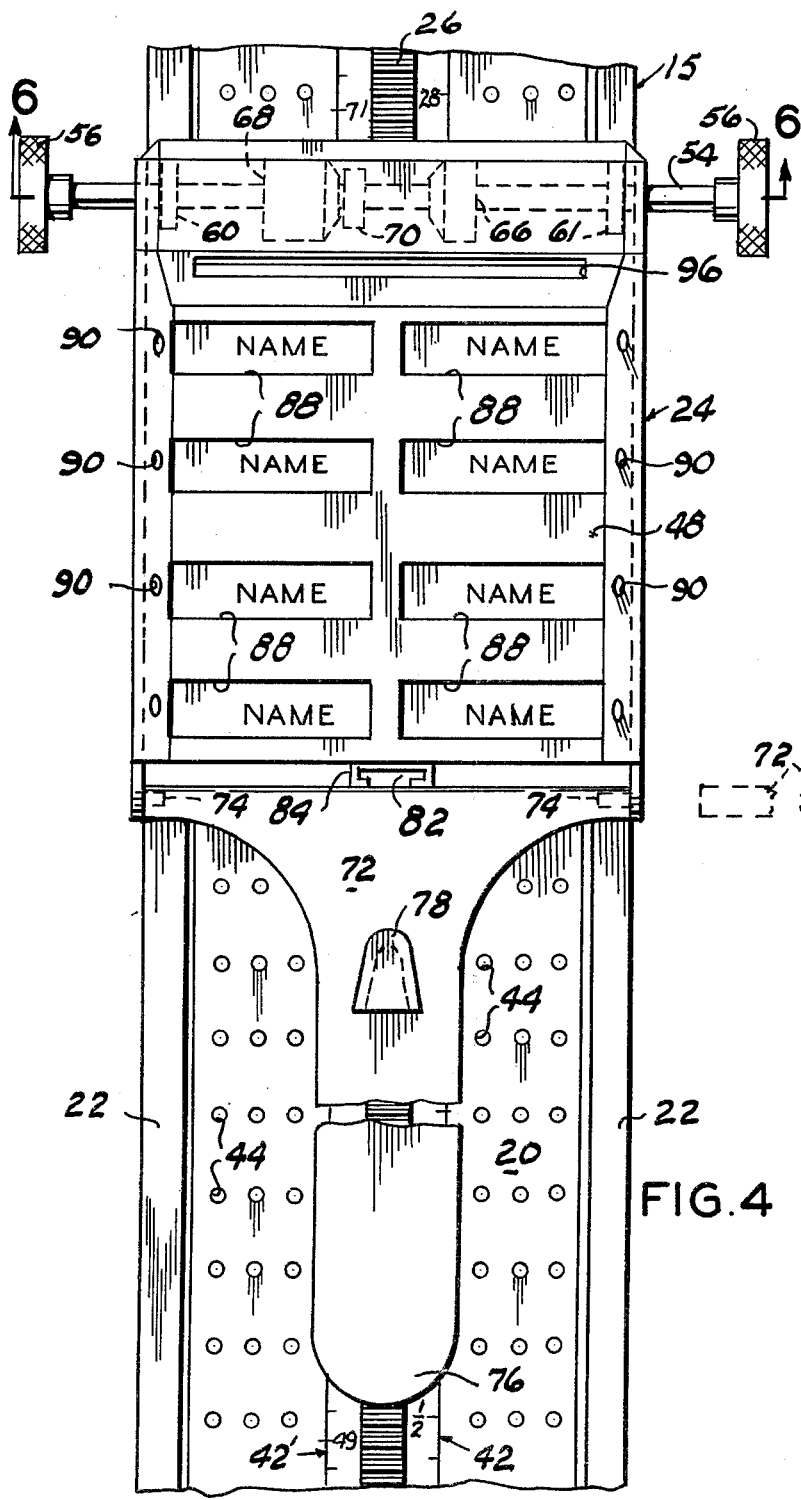
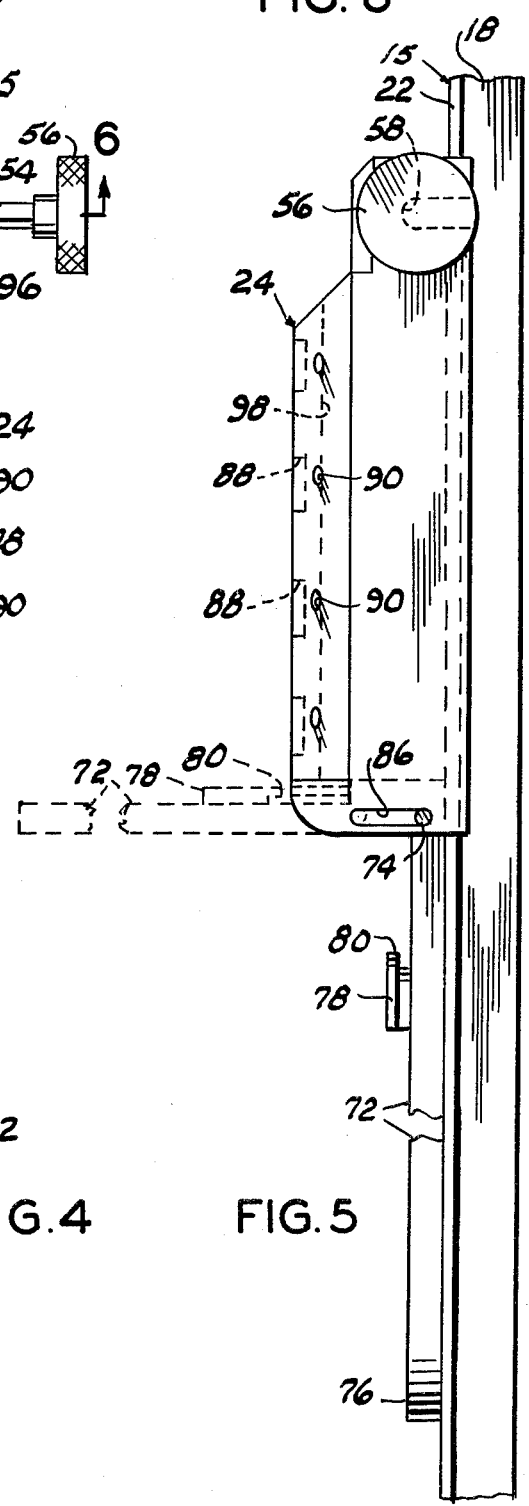

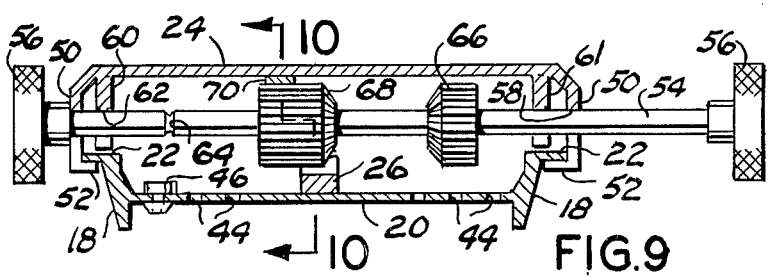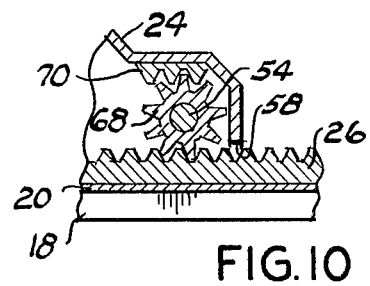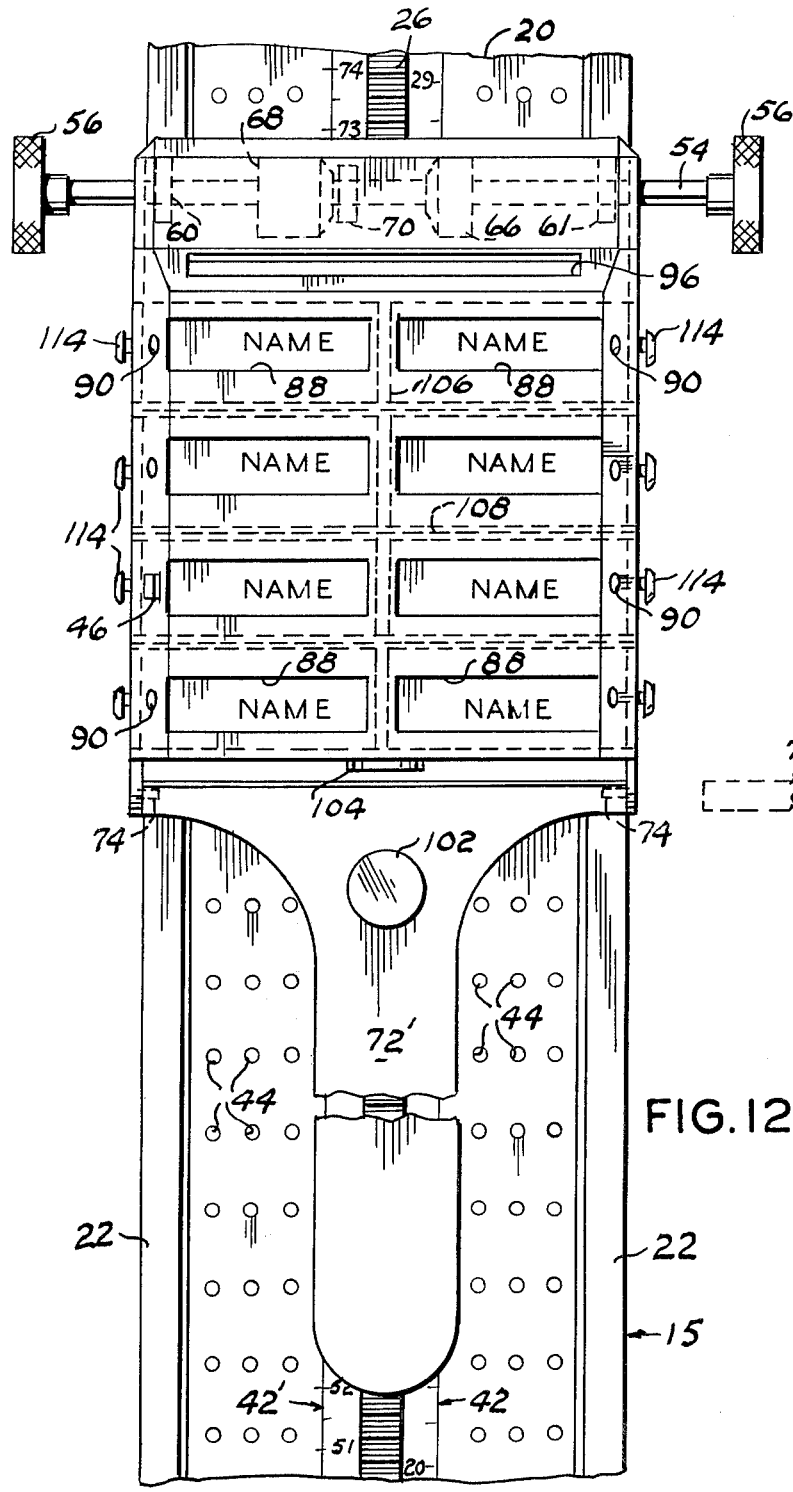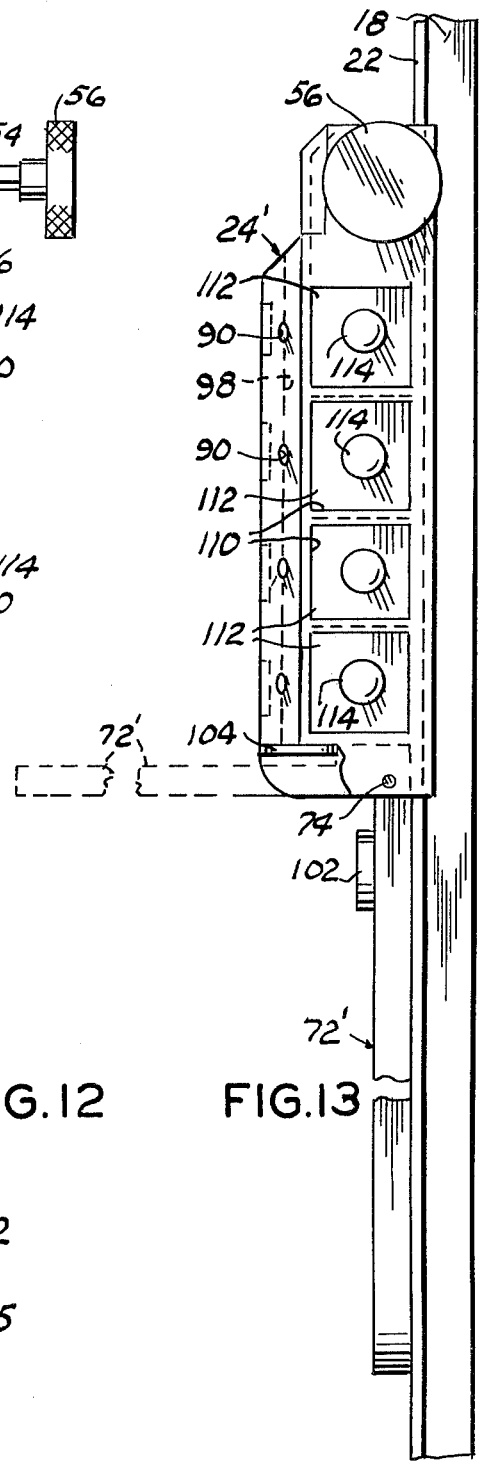

GROWTH MEASURING SCALE

BACKGROUND OF THE INVENTION

1. Field of the Invention

The present invention relates to measuring scales of the type to be attached to a vertical surface for measuring and recording the height and growth rate of individuals.

Some families make a practice of maintaining a family record of growth rate of the height of growing children by marking such heights as well as the weight and date on some portion of a vertical wall in the home, however, due to changing conditions, such as moving from one residence to another or redecorating, the growth record is lost or destroyed.

This invention provides a device by which a family can record the height and/or growth rate of substantially all of the individuals in the family which becomes a permanent record and may be moved from one location to another without altering the permanent record.

2. Description of the Prior Art

The prior art generally discloses vertically adjustable scales for measuring the height of an individual wherein the scale includes provision for recording the height and other data thereon in which the scale measuring device is free standing, as in U.S. Pat. No. 3,137,943. Other patents, such as U.S. Pat. No. 2,410,696, disclose a scale and chart device for connection with a vertical wall.

This invention is distinctive over prior patents by providing a wall mounted scale equipped measuring device which supports a vertically slidable head for measuring an individual's height and which includes a plurality of pins to be individually inserted, permanently, into apertures formed in the device in accordance with growth rate. Additionally, the sliding head supports a record book for recording other data of the persons measured.

SUMMARY OF THE INVENTION

An elongated sloping flange I-beam type base member, or panel, adapted to be vertically secured to a wall surface, includes a pair of rails formed on its flanges, vertically slidably supports a head member. A rack, centrally secured longitudinally to the panel web, is engaged by manually rotated pinions supported by a horizontal shaft transversely journalled by the head member for vertical movement of the head or locking the head piece to the base. Scale indicia is scored on or attached to the base on opposing sides of the rack. A head bar, pivotally connected in depending relation with the head member, is manually movable to a horizontal position for contacting the top of the head of a person being measured and determining the height of that person by the position of the head bar. A plurality of register pins are separably indentifiable with respective members of a family for insertion into a selected one of a plurality of holes formed by vertically spaced horizontal rows in the panel web for coinciding with selected equally spaced-apart score lines of the indicia thus forming a permanent record of the respective individual's height at a given date. Identifying names and corresponding pins are carried by one embodiment of the head member for subsequent measurement and pin placement of a growing individual. A record book for recording other data, such as the date and weight, is removably supported by an upwardly open slot formed in the head member. In another embodiment of the head member a plurality of removable drawers are provided with each drawer containing a plurality of the pins corresponding to the pin located adjacent the respective name on the forward surface of the head member.

The principal object of this invention is to provide a height and growth rate record for each member of a family which is simple in construction, easy to assemble and is removably mounted on a vertical wall surface. A further object is to provide juxtaposed inch and metric scales for training children in the use of the metric system of measurement.

BRIEF DESCRIPTION OF THE DRAWINGS

FIG. 1 is a fragmentary elevational view of the base panel, per se.;

FIG. 2 is a horizontal sectional view taken substantially along the line 2—2 of FIG. 1;

FIG. 3 is a fragmentary vertical cross sectional view taken substantially along the line 3—3 of FIG. 1;

FIG. 4 is a fragmentary elevational view of an intermediate portion of the panel having the head member positioned thereon;

FIG. 5 is a right side elevational view of FIG. 4;

FIG. 6 is a horizontal cross sectional view taken substantially along the line 6—6 of FIG. 4 illustrating the head member in free vertical sliding position on the panel;

FIG. 7 is a view similar to FIG. 6 illustrating one head member pinion engaged with the base member rack when manually moving the head member by increments in an up or down direction;

FIG. 8 is a fragmentary vertical cross sectional view taken substantially along the line 8—8 of FIG. 7;

FIG. 9 is a vertical cross sectional view similar to FIG. 7 illustrating the locking pinion when shifted for engagement with the rack and locking teeth for maintaining the head member in a selected elevated position;

FIG. 10 is a fragmentary vertical cross sectional view taken substantially along the line 10—10 of FIG. 9;

FIG. 11 is a fragmentary vertical cross sectional view taken substantially along the line 11—11 of FIG. 6;

FIG. 12 is a view similar to FIG. 4 illustrating another embodiment of the head member;

FIG. 13 is a right side elevational view of FIG. 12; and,

FIG. 14 is a plan view of a family sheet or record book removably supported by either head member.

DESCRIPTION OF THE PREFERRED EMBODIMENTS

Like characters of reference designate like parts in those figures of the drawings in which they occur.

In the drawings:

The reference numeral 15 indicates an elongated base panel adapted to be vertically secured to the surface of a vertical wall 16 in the manner hereinafter explained.

The panel 15 is formed from lightweight sloping flange I-beam material having substantially L-shaped flanges 18 joined in spaced-apart relation by a central web 20. The oppositely directed foot portions 22 of the L-shaped flanges form a pair of tracks for slidably supporting a head member 24 (FIG. 4), as presently explained. The panel 15 is provided with an elongated coextensive primary rack 26 secured to the outwardly disposed face of the web 20 medially its width so that the rack teeth 28 project outwardly from the surface of the wall 16 for the purposes presently explained. The panel 15 is preferably formed in elongated sections, only a lower and upper section 30 and 32, respectively, being illustrated in FIG. 1, so that a plurality of the sections may form the desired vertical height. At their juncture, indicated by the lines 33 and 34, the meeting surface of the panel sections are staggered to insure accurate longitudinal alignment of the sections when joined together. A plurality of sections are vertically secured to the wall by a plurality of screws 36 extending through the rack 26, web 20 and spacers 40 interposed between the web and adjacent surface of the vertical wall 16 at least at the position of the screws.

Indicia 42, indicating units of measurement, is preferably scored on or attached to the outwardly disposed face of the web 20 adjacent the rack 26. In the example shown, the indicia 42 comprises inches and increments thereof on one side of the rack 26 and other indicia 42', comprising metric units of measurement, on the opposite side of the rack 26 so that children using the measuring device may readily learn the equivalents of measurement or the respective scales.

The web 20 is further provided with a plurality of apertures 44 arranged in horizontal equally spaced rows with the respective rows of apertures arranged in longitudinal spaced relation corresponding to selected increments of a scale, such as every one half inch. Obviously the rows of apertures may be spaced longitudinally of the base in accordance with selected increments of the metric scale, if desired. The purpose of the apertures 44 is for receiving one of a plurality of pins 46, as hereinafter explained.

Referring more particularly to FIGS. 4, 5, 6 and 11, the head member 24 is rectangular box-like in general configuration, preferably formed from lightweight material, with one side thereof being open toward the base and its opposite forward surface 48 forming a front wall. The side walls 50 of the head are provided with a depending flange edge 52, as viewed in FIG. 6, which contacts the surface of the panel track 22 facing the wall 16 for sliding movement therealong. The thickness of the upper end portion of the head 24 is reduced and transversely journals a control shaft 54 projecting beyond the respective sides of the head member and provided at its respective ends with knurled control knobs 56. The control shaft 54 is inserted into the head member 24 through slots 58 (FIG. 5) in the respective side wall 50 and is supported by a pair of prongs 60 and 61 adjacent the respective inner surface of the side walls 50. The prongs 60 are provided with bifurcated befurcated depending end, as viewed in FIG. 11, for resilient reception of the shaft 54. The left hand prong 60, as viewed in FIG. 6, is provided with a tip 62 which is resiliently received by an annular groove 64 formed in the shaft for indexing the shaft when moved in an axial direction as an indication that the shaft is centrally disposed transversely of the head member for the purposes readily apparent.

The shaft 54 is provided at one end portion with a rolling cog wheel or pinion 66 having teeth engageable with the teeth of the rack 26 so that when the shaft is manually moved toward the left, as viewed in FIG. 7, rotation of the shaft by the knobs 56 move the head 24 up or down by increments of measurement equalling the pitch diameter of the pinion and rack teeth. A lock cog wheel or pinion 68 is coaxially secured to the other end portion of the shaft 54 and is engageable with the teeth of the rack 26 when the shaft is axially moved toward the right, as viewed in FIG. 9. In this position the teeth of the pinion 68 also engage the teeth of a locking rack 70 secured to the adjacent surface of the head 24 so that the head 24 is supported in locked relation with respect to the panel 15.

The depending end of the head 24 is provided with a head bar 72 pivotally connected at its upper end by rivets or pins 74 to depending wall extensions of the head 24 for vertical pivoting movement of the handle free end portion 76 about the axis of the pins 74, to its horizontal position, as illustrated by the dotted lines (FIG. 5), for the purposes of contacting the head of an individual being measured, not shown.

The normally outwardly disposed surface of the head bar 72 is provided with a locking lug 78 having an overhanging lip 80 for engagement within a cooperating T-shaped recess 82 formed in a lug 84 attached to the depending limit of the head 24. The locking lug 78 is inserted into the recess 82 by sliding the head bar outwardly with respect to the panel and head within slots 86 (FIG. 6) formed in the head depending walls slidably supporting the pins 74.

The forward surface 48 of the head is provided with a plurality of rectangular recesses or indentations 88 with the inner surface of the recess covered or coated with material on which names of the individuals may be written.

Apertures 90, one for each recess 88, is provided in the side wall of the head in transverse alignment with the respective recess for receiving one of the pins 46 as an identification of which pin is to be placed in the panel apertures 44 for recording growth rate of the respective individual.

As shown in FIGS. 6 and 7, the pins 46 are provided with a flat head 92 larger than the diameter of the apertures 44 and the stem of the respective pin 46 is provided with prongs 94 which, after being inserted through one of the apertures, normally prevents removal of the pins 46.

As shown in FIG. 1, the pins 46 are characterized by a plurality of different shaped heads 92 which may be square, circular, triangular, cross shaped or of irregular configuration so that each person has a definite shaped pin for recording his growth rate. Obviously, the pins may be formed of or covered with different colors for further separate identification.

The head 24 is also provided with a transverse slot 96 opening into a vertical chamber 98 (FIG. 5) which removably supports a card or book 100 on which the names of the family members are written and provided, if desired, with columns indicating age, weight, height or other data, not shown.

Referring more particularly to FIGS. 12 and 13, another embodiment of the head member is indicated at 24' which is substantially identically formed with respect to the head 24 with the following exceptions: The head bar 72' is pivotally connected with the head side walls and the slots 86 omitted. The lug 78 and the recess forming member 84 are omitted and replaced by a permanent magnet 102, in the position of the lug 78, and a metallic member 104 is secured to the depending end of the head 24' in cooperative position with respect to the magnet 102 so that the magnet releaseably secures the head bar 72' in a horizontal position, as indicated by the dotted lines in FIG. 13. The interior of the head 24', inwardly of the chamber 98, is centrally divided vertically by a partition 106 and transversely divided by shelf-like partitions 108 to form a plurality of chambers 110 slidably receiving a like plurality of box-like trays or bins 112 open in an upward direction, as viewed in the drawings, and provided with pull knobs 114 for containing a plurality of the pins 46 for the position of the respective name in the recesses 88.

OPERATION

The panel 15 is installed on the wall 16 at a selected location by positioning the depending end of the lowermost section 30 in spaced relation with respect to the floor, not shown, a dimension in accordance with the smallest indicia of either of the scales. In the example shown, this dimension is 17 inches thus disposing the panel 15 in a sufficient distance above the floor so that it offers no obstruction to appliances, or the like, when cleaning the floor. The panel section 30 is disposed vertically as by placing an ice pick, or the like, not shown, through the uppermost screw receiving hole so that gravity plumbs the panel section. The section 30 is then secured to the wall 16 by the screws 36. Additional sections of the panel are then vertically disposed above the panel 30 and similarly secured to the wall.

The head member, having the shaft 54 indexed by the tip 62, may be engaged with the panel by sliding its flanges 52 over the tracks 22 at either the upper or lower end of the panel. In this position of the shaft 54, the head member must be manually supported since it is free to move longitudinally of the panel. When measuring the height of a person, the shaft 54 is moved axially toward the left, as viewed in the drawings, so that the pinion 66 engages the rack teeth 28 (FIG. 7). The head 24 may then be moved vertically by rotating the knobs 56. The free end portion 76 of the head bar is raised to a horizontal position and retained in this position by its connection with the head member, as explained hereinabove.

The head is lowered until the depending surface of the head bar lightly contacts the top of the head of the person being measured and while the head member 24 is in this position the shaft 54 is moved axially toward the right, as viewed in the drawings, to the position shown by FIG. 9 wherein the pinion 68 engaging the rack teeth 28 and lock teeth 70 maintains the head member locked against movement relative to the panel. The depending surface of the head bar then becomes a line of sight for determining, on the scales 42 or 42', the height of the person. One of the pins 46, according to the person's name, as shown on the front of the head member, is inserted into one of the apertures in the horizontal line of apertures coinciding with or the nearest to the determined height of the person. This information and other data, as desired, is also recorded in the family record book 100. The locking pinion 68 is usually left in this position for supporting the head member on the panel and the head bar is released from its temporary support from the head member to a depending out-of-the-way position.

Obviously the invention is susceptible to changes or alterations without defeating its practicability. Therefore, I do not wish to be confined to the preferred embodiment shown in the drawings and described herein.

I claim:
1. A growth measuring scale, comprising:
    elongated rigid panel means adapted to be vertically secured to a wall surface,
        said panel means having spaced-apart rails forming a pair of coextensive tracks;
    a primary rack coextensive with and secured to said panel means between said tracks;
    indicia indicating units of measurement extending longitudinally along said panel means on opposite sides of said rack;
    a head member having track engaging walls vertically slidable along said tracks;
    manually rotatable control shaft means extending transversely through said head member and engageable with said primary rack for moving said head member relative to said panel means; and,
    a head bar pivotally connected, at one end, with said head member for vertical pivoting movement of its other end portion about a horizontal axis toward and away from said panel means for determining the position of the lowermost limit of said head bar with respect to said indicia when the head bar is horizontally disposed.
2. The growth measuring scale according to claim 1 in which said panel means comprises a sloping flange type I-beam having
    a web extending between the flanges and having a plurality of verticaly spaced-apart horizontal rows of apertures in the web.
3. The growth measuring scale according to claim 2 and further including:
    a plurality of pins each having a head and a shank portion snugly receivable by the apertures for recording measured heights.
4. The growth measuring scale according to claim 3 in which said head member is rectangular box-like in general configuration having an open side facing toward said panel means, said control shaft means including:
    a shaft journalled by said head member side walls and axially movable transversely of the head member; and,
    a pair of pinions on said shaft and axially movable with said shaft individual meshing engagement with said primary rack.
5. The growth measuring scale according to claim 4 and further including:
    a lock rack secured to an inner surface of said head member and engageable by one of said pinions when said one pinion is in one position for preventing movement of said head member relative to said panel means.
6. The growth measuring scale according to claim 4 and further including:
    means on said head bar engageable with said head member for holding said head bar in a horizontal position.
7. The growth measuring scale according to claim 6 and further including:
    partitions dividing the interior of said head member to form a plurality of article receiving chambers.

* * * * *